United States Patent
Lamb et al.

(10) Patent No.: US 11,835,644 B2
(45) Date of Patent: *Dec. 5, 2023

(54) ADAPTIVE CORRECTION OF RADAR CHANNEL-TO-CHANNEL TIME-DEPENDENT ERRORS

(71) Applicant: Electromagnectic Systems, inc., El Segundo, CA (US)

(72) Inventors: Brian Michael Lamb, Manhattan Beach, CA (US); Stephen Jeffrey Hershkowitz, Manhattan Beach, CA (US)

(73) Assignee: Electromagnetic Systems, Inc., El Segundo, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 17/216,454

(22) Filed: Mar. 29, 2021

(65) Prior Publication Data

US 2021/0215792 A1    Jul. 15, 2021

Related U.S. Application Data

(63) Continuation of application No. 16/207,102, filed on Dec. 1, 2018, now Pat. No. 10,989,793.

(Continued)

(51) Int. Cl.
*G01S 7/40* (2006.01)
*G01S 13/42* (2006.01)
(Continued)

(52) U.S. Cl.
CPC .............. *G01S 7/40* (2013.01); *G01S 7/4021* (2013.01); *G01S 13/42* (2013.01); *G01S 13/931* (2013.01); *G01S 13/582* (2013.01)

(58) Field of Classification Search
None
See application file for complete search history.

(56) References Cited

U.S. PATENT DOCUMENTS 5,579,011 A * 11/1996 Smrek ................. G01S 13/9023
                                                                    342/113
5,818,383 A * 10/1998 Stockburger ............ G01S 7/415
                                                                    342/161

(Continued)

FOREIGN PATENT DOCUMENTS

CN          102221689 B  *  9/2012  ............... G01S 7/40

OTHER PUBLICATIONS

T. Yang et al, "Channel Error Estimation Methods for Multichannel SAR Systems in Azimuth"; published in "IEEE Geoscience and Remote Sensing Letters"; vol. 10, No. 3; May 2013; IEEE, Piscataway, NJ, USA; pp. 548-552. (Year: 2013).*

*Primary Examiner* — Bernarr E Gregory
(74) *Attorney, Agent, or Firm* — ALONZON ASSOCIATES; Arlyn Alonzo

(57) ABSTRACT

Aspects of the disclosure are directed to adaptive correction of radar channel-to-channel time-dependent errors. In accordance with one aspect, the adaptive correction of radar channel-to-channel time-dependent errors includes transforming a digitized data flow to generate a transformed data flow; detecting the transformed data flow to generate a detected data flow; focusing the detected data flow to generate a focused data flow; and aligning the focused data flow to generate a corrected data flow. In one aspect, it may further include performing a direction of arrival (DOA) processing on the corrected data flow to generate a resolved data set, processing the resolved data set to generate a post-processed data set, radiating a transmit radar waveform, capturing a receive radar waveform related to the transmit radar waveform and generating the digitized data flow based on the receive radar waveform.

20 Claims, 3 Drawing Sheets

Related U.S. Application Data

(60) Provisional application No. 62/593,252, filed on Dec. 1, 2017.

(51) Int. Cl.
*G01S 13/931* (2020.01)
*G01S 13/58* (2006.01)

(56) References Cited

U.S. PATENT DOCUMENTS

| | | | |
|---|---|---|---|
| 6,400,306 B1* | 6/2002 | Nohara | G01S 13/87 342/25 R |
| 6,549,160 B2* | 4/2003 | Meyer-Hilberg | G01S 13/9029 342/25 R |
| 6,608,585 B2* | 8/2003 | Benitz | G01S 13/9011 342/25 R |
| 7,088,765 B1* | 8/2006 | Green | H04L 27/364 375/144 |
| 7,106,243 B2* | 9/2006 | Krikorian | G01S 13/9019 342/25 R |
| 7,236,750 B2* | 6/2007 | Vaidyanathan | H04B 1/0475 455/103 |
| 7,646,327 B1* | 1/2010 | Freeman | G01S 13/9029 342/194 |
| 7,782,235 B1* | 8/2010 | Velazquez | H03M 1/1052 455/303 |
| 8,704,705 B2* | 4/2014 | Dougherty | G01S 7/4026 342/169 |
| 8,952,844 B1* | 2/2015 | Wasiewicz | H04L 25/03019 342/16 |
| 9,110,170 B1* | 8/2015 | Woollard | G01S 13/89 |
| 10,989,793 B2* | 4/2021 | Lamb | G01S 13/42 |
| 2017/0212214 A1* | 7/2017 | Murali | G01S 7/4021 |

* cited by examiner

ADAPTIVE CORRECTION OF RADAR CHANNEL-TO-CHANNEL TIME-DEPENDENT ERRORS

CLAIM OF PRIORITY

The present Application is a continuation application of U.S. patent application Ser. No. 16/207,102 filed on Dec. 1, 2018 and entitled ADAPTIVE CORRECTION OF AUTOMOTIVE RADAR CHANNEL-TO-CHANNEL TIME-DEPENDENT ERRORS" which claims priority to Provisional Application No. 62/593,252 entitled "ADAPTIVE CORRECTION OF AUTOMOTIVE RADAR CHANNEL-TO-CHANNEL TIME-DEPENDENT ERRORS" filed Dec. 1, 2017, and assigned to the assignee, the entire contents of the prior applications are incorporated herein by reference as if fully set forth below in its entirety and for all applicable purposes.

TECHNICAL FIELD

This disclosure relates generally to the field of adaptive correction of signal processing errors, and, in particular, to adaptive correction of radar channel-to-channel time-dependent errors.

BACKGROUND

Radars, such as automotive radars, with multiple channels may be low-cost mass-produced devices that have time-varying channel-to-channel phase and/or amplitude mismatches. These channel-to-channel mismatches may be caused by temperature sensitivity or other environmental changes, mechanical mounting issues, or other sources. Although automotive radar manufacturers attempt to minimize and/or compensate for these effects on the device performance, uncorrected channel-to-channel mismatches sometimes persist.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides techniques and apparatus relating to adaptive correction of signal processing errors. Accordingly, a method for adaptive correction of radar channel-to-channel time dependent errors includes transforming a digitized data flow to generate a transformed data flow; detecting the transformed data flow to generate a detected data flow; reformatting the detected data flow for autofocusing; focusing the detected data flow to generate a focused data flow; and aligning the focused data flow to generate a corrected data flow.

In one example, the method further includes performing a direction of arrival (DOA) processing on the corrected data flow to generate a resolved data set. In one example, the method further includes processing the resolved data set to generate a post-processed data set. In one example, the method further includes radiating a transmit radar waveform using one or more transmit antenna elements. In one example, the method further includes capturing a receive radar waveform related to the transmit radar waveform using one or more receive antenna elements. In one example, the method further includes generating the digitized data flow based on the receive radar waveform.

In one example, the method further includes converting the transmit radar waveform into transmitted electromagnetic energy. In one example, the method further includes using one or more transmit elements for converting the transmit radar waveform. In one example, the receive radar waveform includes a scaled replica of the transmit radar waveform with a time delay $\tau$ (tau) and a Doppler shift $v$ (nu) for an object of interest. In one example, the aligning the focused data flow includes correcting one or more phase or amplitude of the focused data flow.

In one example, the method further includes using a complex scaling of the focused data flow. (none example, the complex scaling includes in-phase and quadrature components of the focused data flow. In one example, the complex scaling includes magnitude and phase components of the focused data flow.

Another aspect of the disclosure provides an apparatus for adaptive correction of radar channel-to-channel time dependent errors, the method including a range/Doppler transformer to transform a digitized data flow to generate a transformed data flow; a detection processor, coupled to the range/Doppler transformer, to detect the transformed data flow to generate a detected data flow; an autofocus processor, coupled to the detection processor, to reformat the detected data flow for autofocusing and to focus the detected data flow to generate a focused data flow; and a channel alignment processor, coupled to the autofocus processor, to align the focused data flow to generate a corrected data flow.

In one example, the apparatus further includes a direction of arrival (DOA) processor, coupled to the channel alignment processor, to perform a direction of arrival (DOA) processing on the corrected data flow to generate a resolved data set. In one example, the apparatus further includes a post-processor, coupled to the DOA processor, to process the resolved data set to generate a post-processed data set. In one example, the apparatus further includes one or more transmit antenna elements to radiate a transmit radar waveform.

In one example, the apparatus further includes one or more receive antenna elements to capture a receive radar waveform related to the transmit radar waveform. In one example, the apparatus further includes a radar transceiver, coupled to the one or more receive antenna elements and the one or more transmit antenna element, to generate the digitized data flow based on the receive radar waveform.

In one example, the channel alignment processor aligns the focused data flow by correcting one or more phase or amplitude of the focused data flow, or by using a complex scaling of the focused data flow. In one example, the correcting one or more phase or amplitude or the complex scaling includes in-phase and quadrature components of the focused data flow. In one example, the correcting one or more phase or amplitude or the complex scaling includes magnitude and phase components of the focused data flow.

These and other aspects of the disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
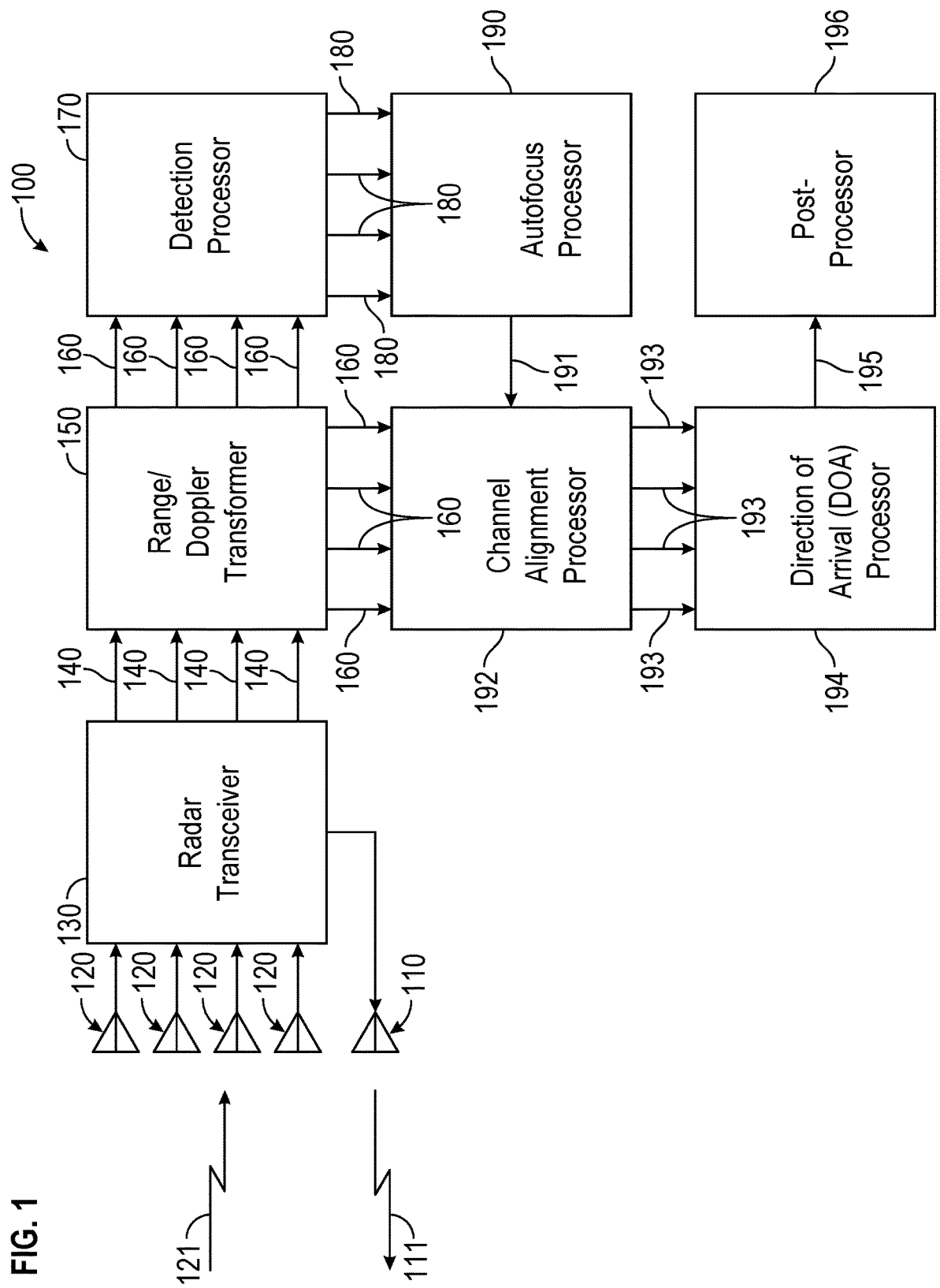
FIG. 1 illustrates an example block diagram of an automotive radar in accordance with the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one example, the present disclosure provides a process to adaptively compensate for channel-to-channel phase and/or amplitude mismatches in a radar through digital signal processing. For example, digital signal processing may include signal processing algorithms which transform signals in radar channels to processed signals. If these mismatches are not corrected, they may result in object angle measurement errors and/or a degradation of the radar antenna beam pattern. In one aspect, the present disclosure is applicable to automotive radars with multiple channels, e.g., electronically scanned array automotive radars, Multiple Input Multiple Output (MIMO) automotive radars, and other variants of automotive radars possessing multiple channels for spatial diversity. In another example, the present disclosure is applicable to any radar with multiple channels.

In one example, a radar produces a two-dimensional output in each channel, e.g., a radar image as a function of two dimensions, such as range and Doppler offset. For example, the radar image may include a plurality of resolution cells, where a first dimension includes a plurality of range bins (e.g., range resolution cells) and a second dimension includes a plurality of Doppler bins (e.g., Doppler resolution cells). The present disclosure is designed to work even when multiple objects are located in the same range bin, i.e., range resolution cell. One skilled in the art would understand that although automotive radar applications are mentioned herein, other types of applications for correcting channel-to-channel phase and/or amplitude mismatches may be within the spirit and scope of the present disclosure.

FIG. 1 illustrates an example block diagram 100 of an automotive radar in accordance with the present disclosure. In FIG. 1, the flow of data and signal processing through the automotive radar is shown via the arrows. Although only one transmit antenna element 110 is shown in FIG. 1, one or more transmit antenna elements 110 may be used within the spirit and scope of the present disclosure. In one example, a transmit antenna element 110 radiates transmitted electromagnetic energy 111 from a radar transceiver to free space. Multiple receive antenna elements 120 are illustrated in FIG. 1.

In one example, a receive antenna element 120 captures received electromagnetic energy 121 from free space and sends it to a radar transceiver. A radar transceiver 130 is shown in FIG. 1. In one example, the radar transceiver 130 may be an automotive radar transceiver. In one example, the radar transceiver 130 may include a radar transmitter and a radar receiver. In one example, the radar transceiver 130 may generate a transmit radar waveform which is converted to the transmitted electromagnetic energy 111 by the one or more transmit elements 110. In one example, the radar waveform may be a coherent pulsed radar waveform with a quantity of pulses over a coherent time duration.

In one example, the radar transceiver 130 may receive a receive radar waveform from the received electromagnetic energy 112. In one example, the receive radar waveform is a scaled replica of the transmit radar waveform. In one example, the receive radar waveform includes a scaled replica of the transmit radar waveform with a time delay $\tau$ (tau) and a Doppler shift $\nu$ (nu) for an object of interest. A digitized data flow 140 from each receive antenna element is shown in FIG. 1. In one example, the digitized data flow 140 is generated by an analog-to-digital converter (ADC) 141 (not shown) which converts the receive radar waveform to the digitized data flow 140 in the radar transceiver 130. In one example, the digitized data flow 140 may be indexed (i.e., labeled) as a function of delay index and a pulse index. In one example, the delay index maybe denoted as a fast time. In one example, the pulse index may be denoted as a slow time.

A range/Doppler transformer 150 or a similar data transformer of the digitized data flow 140 is shown in FIG. 1. In one example, the range/Doppler transformer 150 performs range compression and Doppler processing to convert the digitized data flow 140 to a transformed data flow 160. For example, the transformed data flow 160 may be a range/Doppler array with a plurality of resolution cells. In one example, the plurality of resolution cells includes a first dimension which may include a plurality of range bins (e.g., range resolution cells) and a second dimension which may include a plurality of Doppler bins (e.g., Doppler resolution cells).

In one example, a transformed data flow 160 is illustrated for each receive channel. In one example, the transformed data flow 160 includes a first transformation from delay index to a range index. In one example, the transformed data flow 160 includes a second transformation from pulse index to a Doppler index. In one example, the plurality of resolution cells may be indexed by the range index and the Doppler index. In one example, the quantity of pulses over the coherent time duration may determine a size of the Doppler resolution cells.

A detection processor 170 (e.g., a processor coupled to a memory unit) for thresholding, Constant False Alarm Rate (CFAR) detection, or similar detection operation is shown in FIG. 1. In one example, a detected data flow 180 is a flow of range/Doppler detections flattened into a one-dimensional data stream. An autofocus processor 190 (e.g., a processor coupled to a memory unit), developed for performing a synthetic aperture radar (SAR) or inverse synthetic aperture radar (ISAR) autofocus algorithm, is shown in FIG. 1. In one example, the detected data flow 180 from each receive channel replaces a range dimension for the autofocus algorithm. In one example, the receive channels replace a slow time dimension for the autofocus algorithm.

In one example, the autofocus algorithm focuses the detected data flow 180. In one example, the focusing may remove arbitrary phase errors (e.g., low order phase errors, high order phase errors, temperature-dependent phase errors, etc.).

A focused data flow 191 for each receive channel is shown in FIG. 1. A channel alignment processor 192 (e.g., a processor coupled to a memory unit) for performing correction of receive channel phase and/or amplitude is also shown. In one example, correction of receive channel phase and/or amplitude is performed using a complex scaling of each receive channel to align the receive channels. In one example, channel alignment normalizes the receive channels in amplitude and adjusts the receive channel in phase. In one example, the channel alignment is based on channel estimates.

A corrected data flow 193 for each receive channel is shown in FIG. 1. A direction of arrival (DOA) processor 194 (e.g., a processor coupled to a memory unit) for executing a DOA algorithm on the corrected data flow 193 is shown. In one example, the DOA algorithm provides an angular estimate of an angular direction of an object of interest. In one example, the angular estimate is a boresight angle (i.e., an angle relative to a receive antenna boresight). In one example, the angular estimate is a pair of angular dimensions (e.g., elevation/azimuth, spherical angles, direction cosines, etc.). In one example, a resolved radar data set 195 is inputted into a post-processor 196. In one example, the resolved radar data set 195 includes the angular estimate of the angular direction of the object of interest. In one example, the post-processor 196 may be a processor coupled to a memory unit. In one example, the post-processor 196 performs additional signal processing of the resolved radar data set 195.

As shown in the example of FIG. 1, one or more transmit antenna elements 110 and multiple receive antenna elements 120 are connected to the radar transceiver 130. In one example, the radar transceiver 130 may include digital to analog converters (DACs), upconverters, filters, amplifiers, passive components, low noise amplifiers, downconverters, analog to digital converters (ADCs), frequency synthesizers, oscillators, etc. Digitized signals from each receive channel may be processed in range/Doppler transformer 150 into another domain (for example the range-Doppler domain) for each real receive channel or virtual receive channel. In one example, a virtual receive channel is a synthesized version of a real receive channel.

In an example of a MIMO radar, range/Doppler transformer 150 may include MIMO processing required to produce virtual receive channels. For example, consider a MIMO radar with three transmit channels and four real receive channels. MIMO processing contained in range/Doppler transformer 150 may produce up to twelve virtual receive channels, for example, by generating three virtual receive channels for every real receive channels. Accordingly, the flows indicated by arrows labeled as 160, 180, 191, and 195 may represent up to twelve virtual receive channels rather than the four real receive channels.

For example, the transformed data flow 160 from each receive channel may include preprocessing in detection processor 170 to mitigate the impact of a receiver noise level on the automotive radar. For example, the receiver noise level may vary over space or over time or both. In one example, preprocessing in detection processor 170 may adaptively compute a detection threshold. In one example, the detection threshold is a quantitative amplitude level which may be used to detect the object of interest in a resolution cell. In one example, detection may be indicated by a discrete level (e.g., TRUE/FALSE, Yes/No, Detect/No Detect, etc.) for each resolution cell. The preprocessing performed in detection processor 170 may include thresholding, a Constant False Alarm Rate (CFAR) detection, or possibly processing a machine learned algorithm to mitigate the impact of noise upon the automotive radar. The multiple dimensional data processed in detection processor 170 (for example range-Doppler data) may be then flattened into a separate one-dimensional data stream for each channel. For example, the detected data flow 180 (e.g., a flow of range/Doppler detections) may be reformatted into a flattened data stream, i.e., a one-dimensional detected data stream.

For example, a receive channel index may represent a second data domain (as represented by the arrows labeled as "180" exiting the detection processor 170). The second data domain may be in a format that may be ingested by a multitude of algorithms, which may be executed by autofocus processor 190, e.g., developed for autofocus of Synthetic Aperture Radar (SAR) or Inverse Synthetic Aperture Radar (ISAR) data. The flattened data stream may take the place of the range domain and the receive channel index may take the place of the slow time dimension. In one example, the algorithms may include Phase Gradient Autofocus (PGA), Rank One Phase Error (ROPE) estimation, and/or various entropy minimization algorithms. Any one or more of such algorithms may be executed by autofocus processor 190.

For example, an advantage of SAR and ISAR processing algorithms may be that they are robust and can readily process data with multiple objects within a range cell. If there are sufficient real or virtual receive channels, a range line culling algorithm, for example, may detect the presence of multiple scatterers in a range cell and thereby remove the range cell. In one example, removing the range cell may improve the performance of algorithms that assume the presence of a single object in the range cell, such as PGA or ROPE. Both PGA and ROPE may produce meaningless results if their input contains excessive noise dominated range-Doppler cells. The impact of these noise-dominated cells is mitigated by the processing of detection processor 170.

Since channel-to-channel errors (i.e., channel-channel mismatches) may be time-dependent, the processing in channel alignment processor 192 may be performed over fixed time dwells of data. In one example, a fixed time dwell is a predetermined time duration. In one example, the fixed time dwells may be chosen to be sufficiently long to produce a meaningful channel-to-channel error estimate without including a rapid variation of the channel-to-channel mismatches. In one example, the fixed time dwells may range from 1 second to tens of seconds. In one example, the fixed time dwells may be chosen to provide sufficient time granularity for the channel-to-channel relative phase and/or amplitude corrected data flow 193 from each receive channel. In one example, the processing in autofocus processor 190 may be over non-overlapping sections in time or may be in some form of a sliding window.

In one example, the algorithms executed in autofocus processor 190 may include a comparison of overall power in the receive channels to provide a correction for channel-to-channel amplitude mismatches. In one example, the power comparison occurs following a thresholding or CFAR process in detection processor 170 to minimize the impact of range-Doppler cells containing only noise.

In one example, the PGA, ROPE, or entropy minimization algorithms executed in autofocus processor 190 may measure a linear channel-to-channel phase error. In one example, the linear channel-to-channel phase error may produce a beam pointing error. Accordingly, any linear phase produced from these algorithms may be measured and removed, or the corrected data flow 192 produced from subsequent blocks of time may be adjusted for a continuous linear adjustment.

Typically, another algorithm may be applied either in autofocus processor 190 or any processor to deduce the beam pointing error from the apparent motion of stationary objects (e.g., clutter returns) through the resulting range-Doppler-angle space. In one example, the cosine of the angle off boresight for each stationary object is equal to the ratio of its apparent range rate to vehicle speed, and a fit to the measured clutter motion may provide the beam pointing error. The channel-to-channel corrections are applied to the transformed data from each receive channel (real or virtual channel) in the channel alignment processor 191. The channel-to-channel corrected data 192 then passes to (DOA) processor 193 for executing the direction of arrival algorithm. The resolved radar data set 195 (e.g., range-Doppler-angle data) then passes to post-processor 196 for further processing of the resolved radar data set 195.

One skilled in the art would understand that although more than one block illustrated in FIG. 1 represents a processor, that the present disclosure of an automotive radar may include one processor or more than one processor, and the one or more processor may be coupled to one or more memory units.

In one example, the automotive radar continuously produces automated updates to mitigate against the antenna beam shape abnormalities due to the time-dependent channel-to-channel phase and amplitude mismatches. The automated updates may be produced regardless of the vehicle motion, i.e., the updates may not require the vehicle to be in motion. In one example, there are two general types of antenna beam errors: beam shape abnormalities due to nonlinear amplitude/phase errors and beam pointing errors due to linear phase errors. A linear spatial dependence of channel-to-channel phase results in antenna beam pointing errors. The automotive radar may require vehicle motion to determine the beam pointing errors due to this spatially dependent linear phase. Accordingly, the automotive radar may not update the linear phase when the vehicle is stationary.

Figure 2:
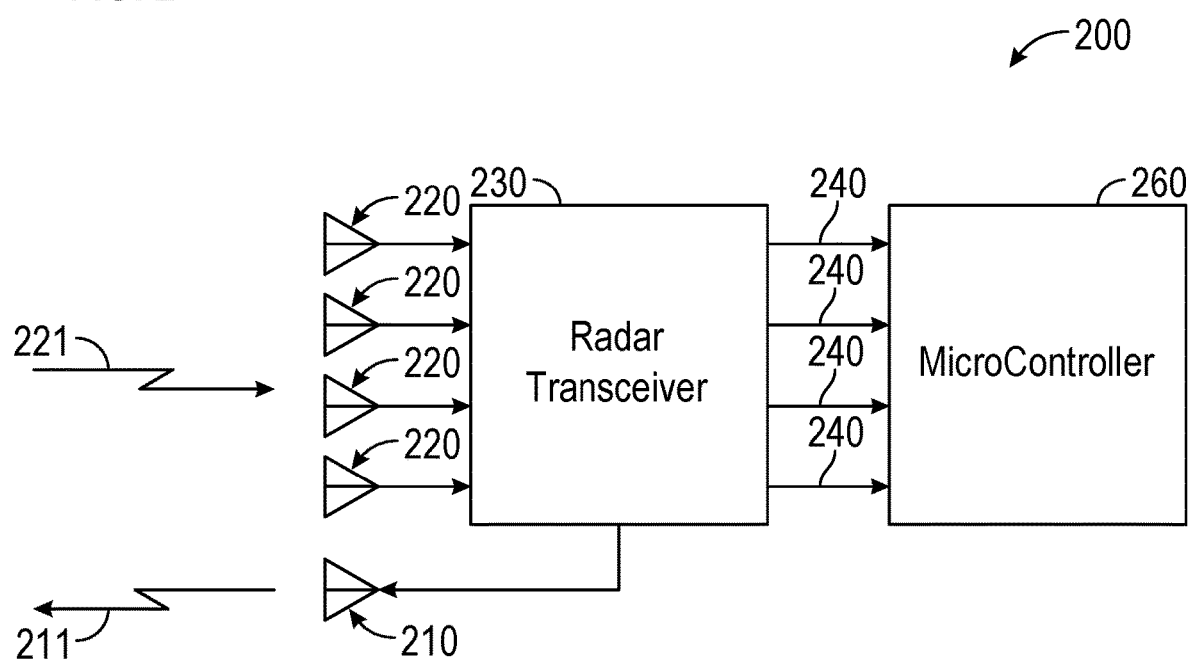
FIG. 2 illustrates an example block diagram of an automotive radar separated into radar antennas, a radar transceiver with a digitized data flowing from the radar transceiver and a radar microcontroller.

FIG. 2 illustrates an example block diagram 200 of an automotive radar separated into radar antennas, a radar transceiver with a digitized data flowing from the radar transceiver and a radar microcontroller. FIG. 2 also illustrates one or more transmit antenna elements 210. In one example, a transmit antenna element 210 radiates transmitted electromagnetic energy from a radar transceiver to free space. Multiple receive antenna elements 220 are shown in FIG. 2. In one example, a receive antenna element 220 captures received electromagnetic energy 221 from free space and sends it to a radar transceiver. Although four receive antenna elements 220 are shown in FIG. 2, one skilled in the art would understand that an example within the spirit and scope of the present disclosure may include fewer than four receive antenna elements 220. Similarly, one skilled in the art would understand that an example within the spirit and scope of the present disclosure may include more than four receive antenna elements 220.

A radar transceiver 230 is shown in FIG. 2. In one example, the radar transceiver 230 may include a radar transmitter and a radar receiver. In one example, the radar transceiver 230 may generate a transmit radar waveform which is converted to the transmitted electromagnetic energy 211 by the one or more transmit elements 210. In one example, the radar transceiver 230 may receive a receive radar waveform from the received electromagnetic energy. In one example, the receive radar waveform is a scaled replica of the transmit radar waveform. In one example, the receive radar waveform includes a scaled replica of the transmit radar waveform with a time delay $\tau$ (tau) and a Doppler shift $\nu$ (nu) for an object of interest. In one example, the radar transceiver 230 produces a digitized data flow 240 for each receive antenna element 220. In the example of FIG. 2, since four receive antenna elements 220 and one transmit antenna element 210 are shown, four digitized data flows 240 are shown. One skilled in the art would understand that as the quantity of receive antenna elements and/or transmit antenna elements vary, the quantity of digitized data flow may vary accordingly.

In one example, the digitized data flow 240 is sent to a microcontroller 260. In one example, signal processing described in the FIG. 1 occurs in the microcontroller 260. In one example, the microcontroller 260 may be a microprocessor, a digital signal processing chip, a general processing chip, etc. In one example, microcontroller 260 may include one or more of the blocks illustrated in FIG. 1.

Figure 3:
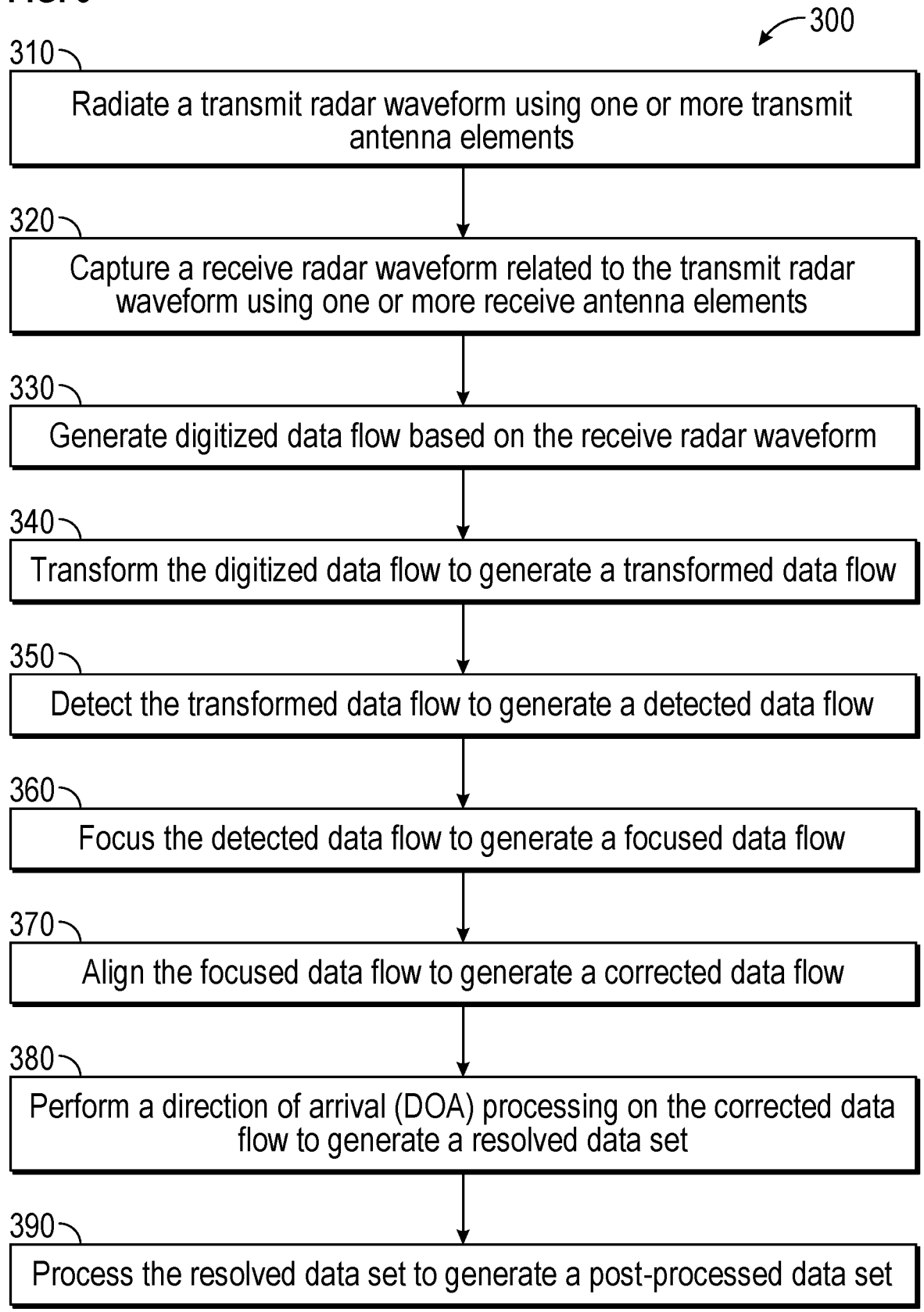
FIG. 3 illustrates an example flow diagram for adaptive correction for radar channel-to-channel time-dependent errors.

FIG. 3 illustrates an example flow diagram 300 for adaptive correction for radar channel-to-channel time-dependent errors. In block 310, radiate a transmit radar waveform, for example, using one or more transmit antenna elements. In one example, the transmit radar waveform is from a radar transceiver. In one example, the transmit radar waveform is converted to transmitted electromagnetic energy by the one or more transmit elements. In one example, the transmit radar waveform may be a coherent pulsed radar waveform with a plurality of pulses over a coherent time duration.

In block 320, capture a receive radar waveform related to the transmit radar waveform, for example, using one or more receive antenna elements. In one example, the receive radar waveform is sent to the radar transceiver. In one example, the receive radar waveform is a scaled replica of the transmit radar waveform. In one example, the receive radar waveform includes a scaled replica of the transmit radar waveform with a time delay $\tau$ (tau) and a Doppler shift $\nu$ (nu) for an object of interest.

In block 330, generate a digitized data flow based on the receive radar waveform, for example, using a radar transceiver. In one example, the digitized data flow may be indexed (i.e., labeled) as a function of delay index (e.g., fast time) and a pulse index (e.g., slow time).

In block 340, transform the digitized data flow to generate a transformed data flow, for example, using a range/Doppler transformer. In one example, the transformed data flow results from range compression and Doppler processing to convert the digitized data flow to the transformed data flow. For example, the transformed data flow may be a range/Doppler array with a plurality of resolution cells. In one example, the transformed data flow includes a first transformation from delay index to a range index. In one example, the transformed data flow includes a second transformation from pulse index to a Doppler index. In one example, the plurality of resolution cells may be indexed by the range index and the Doppler index.

In block 350, detect the transformed data flow to generate a detected data flow, for example, using a detection processor. In one example, the detected data flow includes thresholding, Constant False Alarm Rate (CFAR) detection, or similar detection operation. In one example, the detected data flow includes a flow of range/Doppler detections flattened into a one-dimensional data stream. In one example, the detected data flow may be reformatted into a flattened data stream, i.e., a one-dimensional detected data stream.

In block 360, focus the detected data flow to generate a focused data flow, for example, using an autofocus processor. In one example, the focused data flow is produced using an autofocus algorithm. In one example, the detected data flow from each receive channel replaces a range dimension for the autofocus algorithm. In one example, the receive channels replace a slow time dimension for the autofocus algorithm. In one example, the autofocus algorithm generates focus parameters which may be used for channel alignment.

In block 370, align the focused data flow to generate a corrected data flow, for example, using a channel alignment processor. In one example, the corrected data flow includes correction of receive channel phase and/or amplitude. In one example, correction of receive channel phase and/or amplitude is performed using a complex scaling of each receive channel to align the receive channels. In one example, the complex scaling includes in-phase and quadrature components of the focused data flow. In one example, the complex scaling includes magnitude and phase components of the focused data flow.

In one example, channel alignment normalizes the receive channels in amplitude and adjusts the receive channel in phase. In one example, the channel alignment is based on channel estimates. In one example, the channel alignment may be based on focus parameters derived from the autofocus algorithm.

In block 380, perform a direction of arrival (DOA) processing on the corrected data flow to generate a resolved data set, for example, using a direction of arrival (DOA) processor. In one example, the resolved data set includes an angular estimate of the object of interest. In one example, the angular estimate is a boresight angle (i.e., an angle relative to a receive antenna boresight). In one example, the angular estimate is a pair of angular dimensions (e.g., elevation/azimuth, spherical angles, direction cosines, etc.).

In block 390, process the resolved data set to generate a post-processed data set, for example, using a post-processor. In one example, the post-processor 196 performs additional signal processing of the resolved radar data set 195. In one example, the additional signal processing includes data reduction or data compaction.

In one example, the term "to produce" as used in the present disclosure may also be replace by the term "to generate" and still stay within the spirit and scope of the present disclosure. In one aspect, one or more of the process or flow disclosed herein may be executed by one or more processors which may include hardware, software, firmware, etc. The one or more processors, for example, may include one or more memory units to execute software or firmware needed to perform any part of the process or flow described herein. In one example, the memory unit may be one or more of the following: a random access memory (RAM), a read only memory (ROM), a programmable ROM (PROM), an erasable PROM (EPROM), and/or an electrically erasable PROM (EEPROM), etc.

In one example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for performing any of the process or flow described herein. Those skilled in the art will recognize how best to implement the described functionality presented throughout this disclosure depending on the particular application and the overall design constraints imposed on the overall system.

What is claimed is:

1. A method for adaptive correction of radar channel-to-channel time-dependent errors, the method comprising:
    transforming a digitized data flow to generate a transformed data flow;
    detecting the transformed data flow to generate a detected data flow;
    reformatting the detected data flow for autofocusing;
    autofocusing the detected data flow using phase gradient autofocus (PGA) to generate a focused data flow; and
    aligning the focused data flow to generate a corrected data flow.

2. The method of claim 1, further comprising performing a direction of arrival (DOA) processing on the corrected data flow to generate a resolved data set.

3. The method of claim 2, wherein a receive radar waveform includes a scaled replica of a transmit radar waveform with a time delay $\tau$ (tau) and a Doppler shift $\nu$ (nu) for an object of interest.

4. The method of claim 1, wherein the aligning the focused data flow comprises correcting one or more phase of the focused data flow.

5. A method for adaptive correction of radar channel-to-channel time-dependent errors, the method comprising:
    transforming a digitized data flow to generate a transformed data flow;
    detecting the transformed data flow to generate a detected data flow;
    reformatting the detected data flow for autofocusing;
    autofocusing the detected data flow using rank one phase estimation (ROPE) to generate a focused data flow; and
    aligning the focused data flow to generate a corrected data flow.

6. The method of claim 5, further comprising performing a direction of arrival (DOA) processing on the corrected data flow to generate a resolved data set.

7. The method of claim 6, wherein a receive radar waveform includes a scaled replica of a transmit radar waveform with a time delay $\tau$ (tau) and a Doppler shift $\nu$ (nu) for an object of interest.

8. The method of claim 5, wherein the aligning the focused data flow comprises correcting one or more phase of the focused data flow.

9. An apparatus for adaptive correction of radar channel-to-channel time-dependent errors, the apparatus comprising:
    a range/Doppler transformer to transform a digitized data flow to generate a transformed data flow;
    a detection processor, coupled to the range/Doppler transformer, to detect the transformed data flow to generate a detected data flow;
    an autofocus processor, coupled to the detection processor, to focus the detected data flow using phase gradient autofocus (PGA) to generate a focused data flow; and
    a channel alignment processor, coupled to the autofocus processor, to align the focused data flow to generate a corrected data flow.

10. The apparatus of claim 9, further comprising a direction of arrival (DOA) processor, coupled to the channel alignment processor, to perform a direction of arrival (DOA) processing on the corrected data flow to generate a resolved data set.

11. The apparatus of claim 10, further comprising a post-processor, coupled to the DOA processor, to process the resolved data set to generate a post-processed data set.

12. The apparatus of claim 9, wherein the channel alignment processor aligns the focused data flow by correcting one or more phase of the focused data flow, or by using a complex scaling of the focused data flow.

13. The apparatus of claim 12, wherein the correcting one or more phase or the complex scaling includes in-phase and quadrature components of the focused data flow.

14. The apparatus of claim 12, wherein the correcting one or more phase or the complex scaling includes magnitude and phase components of the focused data flow.

15. An apparatus for adaptive correction of radar channel-to-channel time-dependent errors, the apparatus comprising:
    a range/Doppler transformer to transform a digitized data flow to generate a transformed data flow;
    a detection processor, coupled to the range/Doppler transformer, to detect the transformed data flow to generate a detected data flow;
    an autofocus processor, coupled to the detection processor, to focus the detected data flow using rank one phase estimation (ROPE) to generate a focused data flow; and
    a channel alignment processor, coupled to the autofocus processor, to align the focused data flow to generate a corrected data flow.

16. The apparatus of claim 15, further comprising a direction of arrival (DOA) processor, coupled to the channel alignment processor, to perform a direction of arrival (DOA) processing on the corrected data flow to generate a resolved data set.

17. The apparatus of claim 16, further comprising a post-processor, coupled to the DOA processor, to process the resolved data set to generate a post-processed data set.

18. The apparatus of claim 15, wherein the channel alignment processor aligns the focused data flow by correcting one or more phase of the focused data flow, or by using a complex scaling of the focused data flow.

19. The apparatus of claim 18, wherein the correcting one or more phase or the complex scaling includes in-phase and quadrature components of the focused data flow.

20. The apparatus of claim 18, wherein the correcting one or more phase or the complex scaling includes magnitude and phase components of the focused data flow.

* * * * *